April 2, 1940. H. JANDA 2,195,862
WINDSHIELD HEATER
Original Filed Feb. 26, 1936
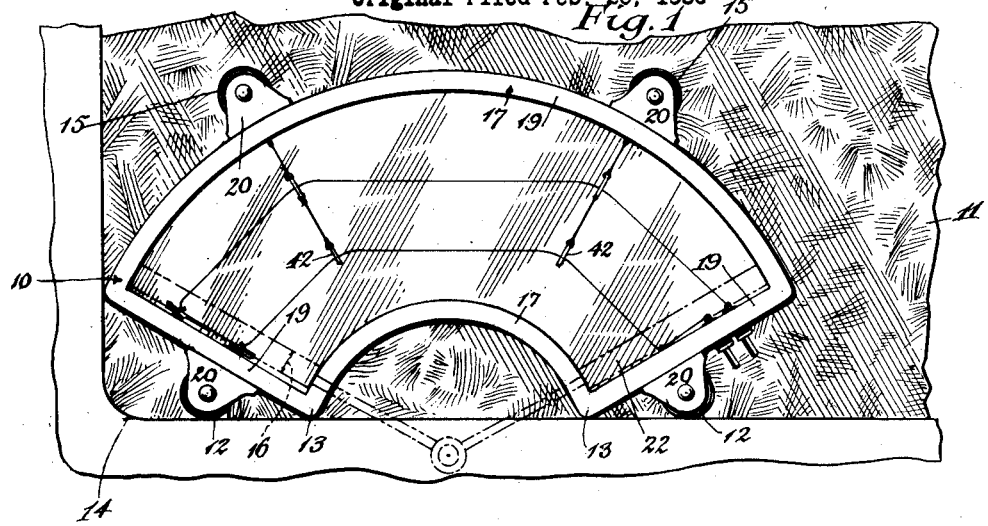
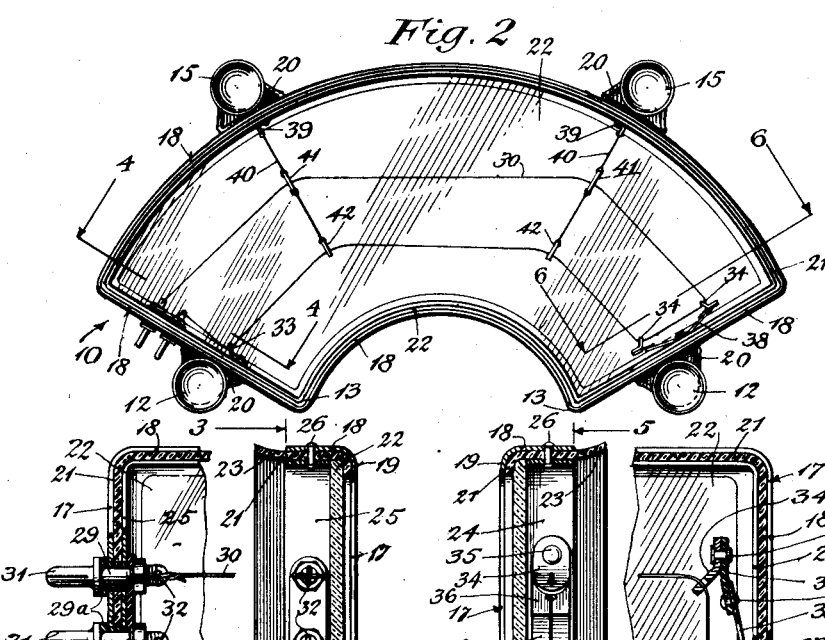
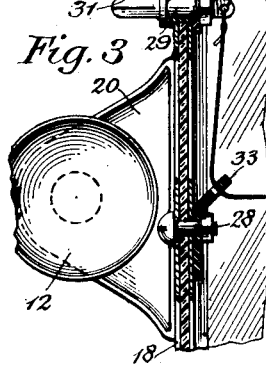
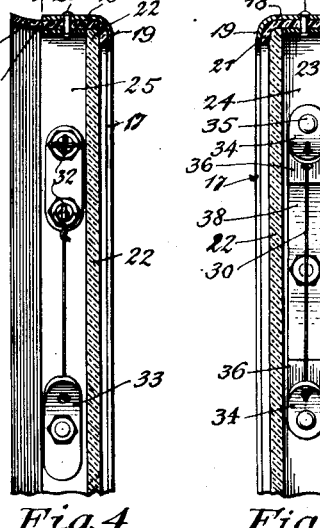
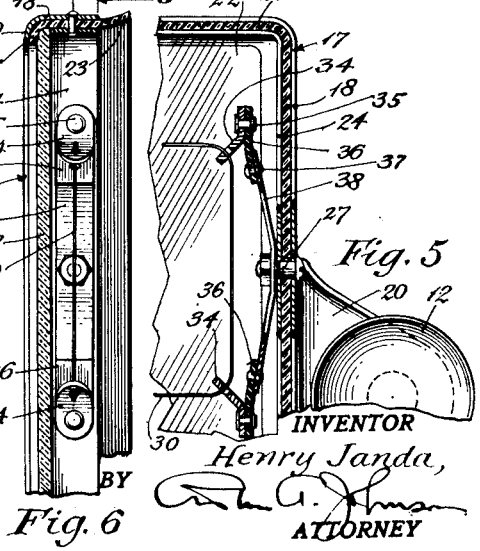
INVENTOR
Henry Janda,
BY
ATTORNEY Patented Apr. 2, 1940

2,195,862

UNITED STATES PATENT OFFICE 2,195,862

WINDSHIELD HEATER

Henry Janda, Clarkson, Nebr., assignor to Joseph H. Cohen, Bridgeport, Conn.

Application February 26, 1936, Serial No. 65,797
Renewed August 11, 1939

5 Claims. (Cl. 219—19)

This invention relates to windshield heaters and defrosters, and, more particularly, to windshield heaters of the kind including a casing made up in part of a transparent sheet of glass or the like to be spaced from a windshield and provide a heating chamber in rear of the area of the windshield through which clear vision should be had for safe driving in inclement weather, and also having heating means for such chamber and means for readily mounting the device on and demounting the same from a selected such area of the windshield.

Devices of this kind have been proposed and employed for precluding the formation of frost or the accumulation of snow and ice on the windshield and to melt away any frozen moisture which may have there formed or accumulated. Such devices are applied to the inner or rear surface of the windshield. It often happens that while rain is falling on the front or outer surface of the windshield, the outside temperature drops below the freezing point. In such cases the windshield wiper, almost always then operated, is unseldom a cause of special trouble. Such wiper, swinging back and forth over the outer surface of the windshield, removes just enough excess water on the outside of the windshield, whether raindrops or particles of mist, to precipitate the freezing of successive thin ice films. This especially happens, as is so frequently the case at certain outside temperatures, where the water or moisture accumulations are such that there would be no freezing were it not for the action of the wiper in smoothing flat the raindrops and water streamlets on the windshield; as proved by the fact that at these times the windshield area swept over by the wiper, and which of course is the very area of the windshield through which it is most important to have clear vision, becomes covered with a substantially opaque layer of ice, yet the remainder of the windshield gives some view of the road ahead even though more or less obscured and distorted by raindrops and the like on the windshield.

One of the objects of the present invention is to provide a windshield heater adapted to heat a minimum amount of windshield surface, so as in any event to operate the device economically, for instance to avoid unnecessary use of battery or other current for the electrical resistance wire equipment preferably incorporated in the device as its heating means, but nevertheless an area of the windshield substantially corresponding to the field of sweep of the wiper; yet a device so shaped that its mounting and demounting means are given novel and valuable locations.

In carrying out the invention for the attainment of the aim just mentioned, the casing of the device is shaped in such manner that its opposite ends extend generally, preferably as straight or substantially straight lines, at oblique angles to the vertical. The general lines of extension of these ends can converge either upwardly or downwardly; but in either case to provide a pair of spaces, within the horizontal limits of the device, for the placement within such limits, but beyond the casing and beyond the limits of the glass therein, of elements of the mounting means for the device.

Said mounting means, according to the now favored practice in the art, comprises a plurality of suction cups located beyond the limits of said glass, or at least beyond the area thereof predetermined for the field of vision of the driver.

Various arrangements have heretofore been proposed for locating the suction cups so as to give them adequate spacing from each other along the length as well as across the width of the frame. To these ends, proposals have been made that the suction cups be carried beyond the casing on extensions at or near the corners thereof; but such projecting suction cup mountings have interfered with properly positioning the device on the windshield, as where the reveal opening of the windshield has rounded corners or is otherwise so shaped or limited relative to the driver's line of vision that he most easily views the road ahead through a corner-adjacent portion of the reveal opening in the windshield. In attempts to avoid the difficulty last referred to, relatively complicated, expensive and unnecessarily expansive casings have been devised with the idea of having the suction cups carried within the frame limits; but only to have the difficulty remain, since then a casing part beyond a suction cup is usually found to be the interfering element.

According to the present invention, however, a heater casing is provided which, although it can most conveniently be shaped in sufficient conformity to the fan-shaped field of sweep of the commonly employed oscillating wiper, to insure that the glass of the heater can substantially match the field of sweep of the wiper, or a portion thereof fully adequate for safe driving in any weather, is adapted to have its suction cups mounting means so located on the casing as to be actually beyond the casing thereof and yet within the horizontal limits of the casing. This follows from the fact that the casing is provided with ends which are thrown out of the vertical and so converged toward each other that spaces for the accommodation of suction cups or equivalents are provided beyond the casing yet near opposite ends of the casing and at the same time within the horizontal limits of the casing; while in connection with the provision of these spaces the casing is most practically shaped to conform substantially to the sides of the field of sweep of an oscillating wiper which converge toward the point of pivotal mounting for such wiper.

In the embodiment of the present invention now preferred, the sides of the frame which join the converging ends thereof are curved and so arranged as generally to arch the frame longitudinally and horizontally, said sides being desirably coincident with arcs of substantially concentric circles of differing radii, especially where the wiper is an oscillating one; although regardless of the mode of operation of the wiper the invention could be otherwise carried out, for instance, by having the frame shaped substantially to the outline of a truncated triangle.

Another object of the invention is to provide a windshield heater including a casing having converging ends as aforesaid, and an electrical resistance wire equipment arranged in the casing in such manner that maximum heating efficiency at minimum current cost is obtained, and at the same time reliability of construction and operation is insured in a combination capable of being fabricated at relatively low cost.

Another object of the invention is to provide a windshield heater including a casing and an enclosed electrical resistance wire equipment, wherein only a single such wire is employed, yet one which has a plurality of substantially parallel stretches thereof extending across the field of vision through the heater.

Another object of the invention is to provide a windshield heater including a casing and an enclosed electrical resistance wire equipment, wherein electrical resistance elements are extended crosswisely as well as lengthwisely of the casing thereby to provide what is in effect a substantially closed frame the members of which are heat-delivering instrumentalities.

Another object of the invention is to provide a windshield heater, including a casing and an enclosed electrical resistance wire equipment, wherein a length of electrical resistance wire is extended across the field of vision through the heater in a non-straight line of extension.

Other objects and advantages of the invention will be apparent hereinafter.

The invention will be more clearly understood, and the various object and advantages thereof appreciated, from the following detailed description of a preferred physical embodiment as illustratively shown in the accompanying drawing, in which:

Figure 1 is a front face view showing said embodiment, that is, looking toward that side thereof which is seen overlying a windshield when the device is applied thereto;

Fig. 2 is a rear face view of said device, detached from the windshield;

Fig. 3 is a fragmentary sectional view, taken on the line 3—3 of Fig. 4;

Fig. 4 is an enlarged fragmentary section, taken substantially on the line 4—4 of Fig. 2;

Fig. 5 is a view similar to Fig. 3, taken on the line 5—5 of Fig. 6;

Fig. 6 is a view similar to Fig. 4, taken substantially on the line 6—6 of Fig. 2.

The device of the present invention, in the exemplary embodiment thereof illustrated in the drawing, incorporates a casing 10, as shown having the outline of that segment of an annulus which is included between approximately 120°: the casing thus having a longer circularly curved side and a shorter similarly curved side, the former of which is at the top of the device as the same is applied to a windshield 11 in Figure 1. As the casing is shown, these curved sides are arcs of concentric circles of different radii, and the converging ends of the casing which join these sides are straight and extend radially of such circles.

The extreme horizontal limits of the casing are at the ends of its circular side of greater length, with the result that spaces are provided, beyond the converging ends of the casing, yet within the horizontal limits thereof, for the accommodation of a pair of suction cups 12. These cups, it will be noted, can be located in these spaces, as shown, so as to be fairly widely separated lengthwisely of the casing, and at the same time, substantially in line with the chord of the arc defining the casing's curved side of less radius. Thus, in placing the device on a windshield as shown in Figure 1, the two points 13 on the casing, which mark the joinings of the last mentioned curved side of the casing with the converging ends thereof can conveniently be rested on the bottom rail of the windshield, to align the device horizontally as the suction cups 12 are pressed against the windshield to mount the device in place.

As shown in Figure 1, the device can be brought up as close to either side vertical rail of the windshield as would ever be required, because neither the suction cup 12 at the end of the device adjacent to that rail, nor any other part of the device, in any way approaches even a more largely rounded corner of the windshield than that indicated at 14.

In addition to the suction cups 12, the device is here provided with another pair of suction cups 15, these spaced along the longer circular side of the casing. More than two suction cups are recommended. It is desirable, also, that an additional cup or cups be spaced from the cups 12 vertically, or crosswisely of the casing. As shown, two such additional cups, 15, are located along the longer curved side of the casing, so spaced from each other and from the cups 12 as to provide an ideal suction cup support on the windshield for the casing.

Because of the provision of the converging ends for the casing, this to provide the spaces for mounting the cups 12 as above described, the ends of the casing become readily substantially conformable to the converging sides of the field of sweep of the working blade 16 of the familiar type of oscillatable sweeper shown in dot and dash lines in Figure 1; and yet, because the suction cups 12 are placed in the spaces resulting from the converging ends of the casing, the latter can be placed as close as would ever be desired to a windshield corner, even with an oscillatable wiper mounted, as shown in Figure 1, so as to have its field of sweep as close as possible to a side rail of the windshield. All these advantages are secured whether the wiper 16 is mounted upstandingly of the pivot about which it is swung back and forth, as illustrated in Figure 1, or whether it be suspended from its pivot, according to another favored mounting (not shown), so as to have a field of sweep below the top rail of the windshield.

The casing can be of inexpensive manufacture. As here shown, the same includes a frame 17 desirably stamped or formed from sheet metal so as to have a continuous side wall 18 and a continuous top flange 19, as indicated most clearly in Figs. 4 and 6. At the proper points around the frame ears 20 are suitably secured thereto, on which ears the suction cups 12 and 15 are mounted in any known or suitable way.

The frame 17 has fitted therein a flexible rubber liner 21 running all around the frame. Set within this liner and cushioned within and against the same is a glass 22; the liner being so shaped that opposite the glass it is L-shaped in cross-section to conform not only to the side wall 18 but also to the top flange 19 of the frame. Said liner projects beyond the frame to present an offset freely flexible lip 23. This lip, running all around the frame, is so projected beyond the latter that incidental to application of the suction cups 12 and 15 to the windshield, the lip first yields slightly and then elastically redisposes itself to seal to the desired degree the chamber between the glass 22 and the windshield when the cups 12 and 15 finally seize the windshield to secure the device thereon.

The glass 22 and the liner 21 are held in place in the frame 17, in the relations just described, by strips 24 and 25, of fibre or other suitable insulation material, one at each end of the casing and within the latter, with their inner edges tight against the inner surface of the glass. As shown in Figs. 2, 4 and 6, these strips may be extended also along the curved top and bottom sides of the casing and they may be parts of one single strip length. As indicated at 26, rivets may be applied at selected points around the frame to hold the fibre parts 24 and 25 in place. Other means for giving said fibre parts secure mountings are also shown. These include a bolt 27 at one end of the casing, and a similar bolt 28 and a pair of studs at the opposite end of the casing which are formed to include bolts 29. These four bolts all pass through the frame 17, the rubber liner 21, and an end fibre strip 24 and 25.

The bolts 27 and 28 serve to assist, in a manner described below, in mounting the heating means within the casing, which heating means is here shown as a single wire 30 of nichrome or other suitable resistance material. The bolts 29, insulated from the frame by bushings 29a of suitable insulating material, are integral parts of split-post terminals 31 on the outside of the frame for connection to a suitable current supply. Said bolts 29, at their inner ends beyond their threaded nut-taking portions, carry small apertured spatulate extensions or fins 32.

Clamped in place by the bolt 28 is an angled cleat 33 of fibre or other suitable insulating material apertured as shown. Similar and similarly apertured cleats 34 are riveted at 35 to terminal pieces 36 of fibre or the like riveted at 37 to the two opposite ends of a leaf spring 38. Through the center of this leaf spring passes the bolt 27, so that when the nut of this bolt is tightened the leaf spring will be dependably anchored in place as illustrated.

Fixed in place within the casing along the longer curved side thereof are elbow brackets 39 and from these are hung stay-structures 40. Each of these stay-structures is made up of two rod or wire lengths, between which is suitably secured a ring or shoe 41 of fibre or other suitable insulating material; and at the outer end of the outer such rod or wire length is suitably secured a similar ring or shoe 42.

The electrical resistance wire 31 is joined at one end, for instance as shown in Fig. 3, to one of the terminal-carried fins 32, and thence the wire 30 is strung through the aperture in the cleat 33, through the two rings 42, through the apertures in the insulation pieces 34 on the leaf spring 38, and through the apertures in the two rings 41.

The wire is pulled sufficiently tight to place the leaf spring 38 under some tension, and to stretch taut the stay-structures 40, and then the other end of such wire is attached, as shown, to the other terminal-carried fin 32.

The stay-structures 40 hold the parts of the wire 30 which extend longitudinally of the casing in the positions illustrated; the bends in these stretches becoming more or less rounded according to the relative degree of flexibility of the resistance wire, and depending also on whether or not such stretches are more or less preformed or biased toward angled or rounded changes of direction at the locations of the insulating rings 41 and 42. In either case, said wire stretches and the stay-structures coact in a manner to hold all these elements in their appointed locations. The leaf spring 38, or an equivalent, not only allows the wire to be tautened in all parts, as above, but insures that when the wire lengths are thus resiliently mounted they will be held taut at all times and against drooping as a result of elongation when heated.

It will be noted that the terminals 31 are fairly close to each other, as is desirable to aid in having considerable stretches of the wire 30 run crosswisely of the casing at both ends, whereby these stretches and the two stretches of the wire which run lengthwisely of the casing can combine to a substantially closed heating frame. A more or less closed heating frame within the casing, or an equivalent, that is, a heating means in the casing which includes a heating element elongated laterally of the casing as well as a heating element elongated longitudinally thereof, is, as the invention is now understood, deemed to be a very valuable and important feature thereof, as giving better, because properly locally intensified, heat emission and distribution, at comparatively low current cost. High efficiency of the heating means is especially desirable in a casing having converging or inclined ends, particularly when also, as for instance shown in the drawing, the casing is shaped to conform to a relatively small field of operation of a windshield wiper. With a heating means having its active parts distributed in the casing according to the present invention, such a casing as that last mentioned can keep the windshield opposite the same perfectly clear, even though the remainder of the windshield be heavily frost and ice-coated as illustrated in Figure 1, and even though the wiper 16 is continuously operating and perhaps smoothing down thin moisture films over its field of operation.

The heating frame provided by the wire 30 is shown as having its main stretches, which run lengthwisely of the casing, non-straight, that is, conforming substantially to the general curvature of the casing. Also, this frame is shown as having such stretches spaced from the sides of the casing a considerably greater distance than the wire stretches which run crosswisely of the casing are spaced from the ends thereof. These arrangements of the heating frame parts relative to the sides and ends of the casing are now recommended, but it will be understood that such heating instrumentalities can be otherwise arranged, and, also, that the substantially closed heating frame is a present preference rather than an absolute necessity, as is also, perhaps, the use of a single continuous length of electrical resistance wire. In various other respects, as will be understood, the invention is susceptible of variations and modifications, and portions of the improvements may be used without others. The scope of protection contemplated is indicated by the claims appended.

I claim:

1. A windshield heater comprising a casing, including a frame having a pair of opposite straight edges converging so that if extended they would cross at a point, and having a pair of substantially concentrically located arcuate edges of different curvature connected with the straight edges, the converging point of the straight edges virtually coinciding with the common center of curvature of the arcuate edges so that the frame thus defined outlines virtually a segment of an annulus; said casing including also a transparent plate of size and shape virtually that of the frame and mounted in said frame; heating means within the casing, comprising an electrical heating wire; supporting means for locating said wire in a virtually arcuate path, including a plurality of flexible tension stays floatingly anchored to the larger arcuate portion of the frame; and means for mounting the casing on the windshield of an automobile.

2. The invention as defined in claim 1, in which the flexible stays have relatively inflexible insulating shoes directly engaging the heating wire.

3. A windshield heater comprising a casing, including a frame having a pair of opposite straight edges converging so that if extended they would cross at a point, and having a pair of substantially concentrically located arcuate edges of different curvature connected with the straight edges, the converging point of the straight edges virtually coinciding with the common center of curvature of the arcuate edges so that the frame thus defined outlines virtually a segment of an annulus; said casing including also a transparent plate of size and shape virtually that of the frame and mounted in said frame; heating means within the casing, comprising a plurality of electrical heating wires; supporting means for locating said heating wires in virtually arcuate paths concentrically disposed, said means including a plurality of tension stays carried by the larger arcuate portion of the frame; and means for mounting the casing on the windshield of an automobile.

4. A windshield heater comprising a casing, including a frame having a pair of opposite straight edges converging so that if extended they would cross at a point, and having a pair of substantially concentrically located arcuate edges of different curvature connected with the straight edges, the converging point of the straight edges virtually coinciding with the common center of curvature of the arcuate edges so that the frame defined thereby outlines virtually a segment of an annulus; said casing including also a transparent plate of size and shape virtually that of the frame and mounted in said frame; heating means within the casing; and means for mounting the casing on the windshield of an automobile, said mounting means including an extension from one of said straight frame sides and a suction cup carried by said extension, said cup being so located that it lies substantially wholly between the vertical limits and also between the horizontal limits of the frame.

5. A windshield heater comprising a casing including a frame having a pair of opposite straight edges converging so that if extended they would cross at a point, and having an arcuate edge connecting the outermost ends of the straight edges, said casing including also a transparent plate of size and shape virtually that of the frame and mounted in said frame; heating means within the casing; and means for mounting the casing on the windshield of an automobile including an extension from one of said straight frame sides and a suction cup carried by said extension, said cup being so located that it lies substantially wholly between the vertical limits and also between the horizontal limits of the frame.

HENRY JANDA.